Patented Feb. 3, 1931

1,791,431

UNITED STATES PATENT OFFICE

HERMANN SCHLADEBACH, OF DESSAU IN ANHALT, AND HERBERT HÄHLE, OF DESSAU-ZIEBIGK IN ANHALT, GERMANY, ASSIGNORS TO GENERAL ANILINE WORKS, INC., OF NEW YORK, N. Y., A CORPORATION OF DELAWARE

PROCESS OF COLORING HIGHER FATTY ACIDS

No Drawing. Application filed November 1, 1928, Serial No. 316,612, and in Germany October 31, 1927.

Our present invention relates to a process of dyeing or coloring higher fatty acids and to the products obtainable by this process.

One of its objects is to provide higher fatty acids or mixtures of higher fatty acids as used in the manufacture of, for instance, candles showing a coloring of an outstanding fastness to the action of light.

Further objects of our invention will be seen from the detailed specification following hereafter.

Higher fatty acids, as for instance stearic acid or its mixtures with ceresin, paraffin or other substances, cannot be dyed or colored with most of the organic dyestuffs or inorganic coloring agents because such dyestuffs and agents are sparingly soluble or insoluble in the higher fatty acids. Thus for instance, compounds containing sulfo-groups or carboxyl groups do not dissolve in the higher fatty acids. There is only a small number of commercial dyestuffs soluble in fat and the dyeings produced with these in fatty acids are often not stable. The dyestuffs are sometimes destroyed even in the dark, much more quickly, however, by the action of light. Some azodyestuffs or triarylmethane dyestuff bases which are soluble in fat are partly destroyed or lose their clear shade even during their dissolution in the fatty acids. Moreover, there are particularly lacking violet, blue and green dyestuffs for this purpose.

According to this invention a much larger number of dyestuffs becomes available if the fatty acid is treated with an amino compound before, during or after the dyeing process. In this manner it is possible to make the colorings much more stable and fast to light. After the higher fatty acids have been caused to react either completely or partly with an amino compound, as for example an alkylamine, arylamine, aralkylamine and particularly an hydroxyalkylamine, they possess a very good dissolving power for most of the organic dyestuffs and for inorganic coloring matters, as for instance heavy metal oxides or heavy salts.

Thus in the new process, there may be used not only the dyestuffs or dyestuff bases which have hitherto been employed for dyeing higher fatty acids, but also for instance—

Dyestuff acids or salts thereof,
Salts of basic dyestuffs,
Sparingly soluble anthraquinone derivatives,
Certain vat dyestuffs, pigments and
Inorganic heavy metal salts.

It is also possible first to treat the coloring agent with an amino compound and then to introduce the product into the fatty acid. Besides simple dispersion or dissolution in the fatty acid there may also occur a transformation; for instance when an inorganic heavy metal salt is used, a complex salt is formed. In the case of dyestuffs containing acid groups an excess of the amino compound is advantageously used, so that the fatty acid to be dyed is partly or completely neutralized.

It is advantageous that the amino compound selected should be one suitable for the constitution of the dyeing agent used.

In any stage of the coloring process, f. i. during or after the coloring and the treatment with an amino compound, there may be introduced a heavy metal salt adapted to modify the final effect by its own coloration or to react with an ingredient used, that is to say with the amino compound or with the coloring matter, for instance with an organic dyestuff, by formation of complex salts or lakes. Thus the chemical and physical properties of the dyestuffs, in particular the shade, may be altered considerably and the fastness may be enhanced, whereas colorings of stability hitherto unattainable are obtained even by means of dyestuffs that are little fast and have not hitherto been used for dyeing higher fatty acids, or so used only to a very small extent.

The colored fatty acids produced by the invention, which acids may contain ceresin, paraffin, agents rendering them turbid, or any other additions, are suitable for the manufacture of candles which burn without residue.

The following examples illustrate the invention, the parts being by weight:—

*Example 1.*—285 parts of stearic acid are melted and stirred at about 120° C. with 61 parts of β-amino-ethyl alcohol or the equivalent quantity of benzylamine, guanidine or piperazine until a uniform, clear liquid is obtained which is feebly alkaline and solidifies on cooling. 100 parts of this mass are melted on the water-bath together with 100 parts of ceresin, paraffin or the like and 0.1 part of aniline-azo-dimethylaniline. If preferred the ceresin, paraffin or the like may be added to the stearic acid before it is melted with the organic base, whereby it is possible to work at a lower temperature. The clear, yellow dyeing thus obtained is considerably faster to light than that obtained in a mixture of stearic acid and ceresin without the addition of an amino compound. The dyestuff named in this example may be exchanged for 1-hydroxy-4-dihydroxyethylaminoanthraquinone, in which case a clear bluish-red of good fastness to light is obtained.

*Example 2.*—28.5 parts of stearic acid are caused to react with 6.1 parts of β-aminoethyl alcohol. The product is melted with 34 parts of ceresin and 0.7 part of cupric chloride is dissolved in the warm mass. The cooled mass is green.

Another metal salt may be substituted for the cupric chloride in this example. With cobalt nitrate a red, with aluminium chloride a yellow, with ferric chloride a brown color is obtained.

*Example 3.*—50 parts of stearic acid are melted with 50 parts of ceresin and the molten mass is caused to react with 3 parts of β-amino-ethyl-alcohol, then stirred, with 1 part of ferric chloride, and finally decanted from a small residue. After cooling the mass is colored a clear vivid yellowish-brown. Copper salts yield bright, clear green tints.

*Example 4.*—5 parts of cupric chloride (CuCl$_2$.2H$_2$O) are introduced into 20 parts of moderately heated β-amino-ethyl alcohol, whereby with development of heat a clear deep blue solution is obtained in the course of a few minutes. 6 parts of this basic complex copper solution are dissolved in a mixture of 50 parts of stearic acid and 50 parts of ceresin. After cooling, a green color is obtained of very good fastness to light.

*Example 5.*—0.035 part of the yellow dyestuff toluidine - azo - 1 - phenyl - 3 - methyl-5-pyrazolone (see Schultz, Farbstofftabellen, 6th edition, No. 21) is dissolved in the red mass obtainable according to Example 2 by means of cobalt nitrate. An intense brown is produced.

*Example 6.*—0.05 part of highly concentrated Victoria blue B (Schultz, Farbstofftabellen, 6th edition, No. 559) is dissolved in a hot mixture of 50 parts of stearic acid and 50 parts of ceresin with the addition of 1.4 part of β-aminoethyl alcohol. 0.06 part of cupric chloride are added to the product while stirring. After cooling, a mass is obtained, the clear deep blue color of which is considerably faster to light than the corresponding dyeing without the addition of a copper compound.

*Example 7.*—A solution of 0.06 part of cupric chloride in 1.4 part of β-aminoethyl alcohol is mixed, while stirring, with 50 parts of stearic acid and 50 parts of ceresin. 0.05 part of Methyl violet B (see Schultz, Farbstofftabellen, 6th edition, No. 515) is dissolved in the mixture thus obtained. The color of the clear violet mass thus produced is much faster to light than that produced without the addition of a copper salt.

*Example 8.*—0.05 part of the dyestuff acid

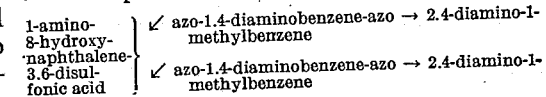

is triturated with 4 parts of triethanolamine, the acid being entirely dissolved. On adding at 90° C., while stirring, 50 parts of stearic acid and 50 parts of ceresin, a uniform melt is obtained. The deep black color of the cooled mass has an excellent fastness to light.

*Example 9.*—0.05 part of the sodium salt of patent blue A (compare Schultz, Farbstofftabellen, 6th edition, No. 545) is dissolved, while moderately heating and finely grinding, in 2 parts of β-aminoethyl alcohol. The solution is then mixed at 90° C. with 50 parts of stearic acid and 50 parts of ceresin. The color is clear greenish blue.

By using in this example the patent blue A in the form of its free acid and substituting for the β-aminoethyl alcohol the same quantity of benzylamine, a somewhat more intense dyeing is produced.

*Example 10.*—0.05 part of alizarine blue B (No. 855 of the 6th edition of Schultz, Farbstofftabellen) in the form of free acid is triturated with 2 parts of butylamine, and the mixture is dissolved at 90° C. in 50 parts of stearic acid and 50 parts of ceresin. The blue dyeing is very fast to light. The dyestuff may also be used in the form of its sodium salt, for instance in combination with diethanolamine.

*Example 11.*—0.05 part of the free 4-chloro-2-amino-1-hydroxybenzene-azo-(7)-1-amino-8-hydroxynaphthalene - 4 - sulphonic acid is triturated with 1 part of β-amino-ethyl alcohol and the mixture is dissolved at 90° C. in 50 parts of stearic acid and 50 parts of ceresin. The dyeing thus produced is violet.

On further dissolving in the mass 0.06 part of cupric chloride (CuCl$_2$.2H$_2$O) a bluish violet color is obtained. The addition of 0.1 part of cobalt nitrate (Co(NO$_3$)$_2$.6H$_2$O) gives a blue color.

*Example 12.*—28.5 parts of stearic acid are caused to react with 6.1 part of β-aminoethyl alcohol; the product is melted with 34 parts of ceresin and in the mass so obtainable there are subsequently dissolved 0.035 part of alizarine and 0.035 part of anhydrous aluminium chloride. The cooled mass is colored dull bluish-red of good fastness to light.

By substituting in this example cupric chloride for the aluminium chloride, a violet dyeing is obtained, whereas the addition of ferric chloride or nickel chloride yields a bluish-violet.

If the stearic acid is not completely neutralized, the same shades are obtainable the stability of which, however, decreases pari passu with the declining proportion of β-aminoethyl alcohol.

*Example 13.*—0.05 part of 3.5-dichloro-2-amino-1-hydroxybenzene-azo-1-phenyl-3-methyl-5-pyrazolone is dissolved in the hot reaction product of 2 parts of β-aminoethyl alcohol and 50 parts of stearic acid mixed with 50 parts of ceresin. A dull greenish-yellow is obtained. On adding 0.07 part of cupric chloride, or 0.3 part of the complex salt mentioned in Example 4, a deep clear brown is obtained. In an analogous manner there are obtained with a cobalt salt, as for instance a benzyl-amine complex salt, a reddish-brown, with an aluminium salt, as for instance aluminium chloride, a reddish-yellow, with a ferric salt, as for instance, ferric chloride, a blackish brown with a green hue. The dyeings produced in combination with copper and cobalt compounds are of a particularly good fastness to light.

When a bluish-red dyestuff is used, for instance 4-chloro-2-amino-1-hydroxybenzene-azo-2-hydroxynaphthalene, there are obtained in combination with copper salts shades up to violet, in combination with cobalt salts shades up to bluish-violet, but in combination with aluminium salts a clear red shade.

*Example 14.*—0.05 part of thioindigo red is triturated with 4 parts of triethanolamine and the mixture is dissolved at 90° C. in 50 parts of stearic acid and 50 parts of ceresin. The cooled mass is bluish-red.

The dyestuff named in this example may be exchanged for instance for thioindigo scarlet or the like, whereby a scarlet-red mass is obtained.

It is obvious to all skilled in the art that our invention is not limited to the foregoing examples or to the specific details given therein. Thus, for instance, the addition of the different ingredients effecting the fast coloring, may be performed in any succession. As mentioned above, the higher fatty acid to be colored may be partly or completely neutralized with an amino compound before adding the coloring matter or the amino compound may be caused to react with the fatty acid previously mixed with the dyeing agent. The same holds true when using a heavy metal compound; in this case the latter may be added in its original state or as a complex compound formed with the amino derivative. The following claims are intended to include all these variations. The term "coloring matter" is intended to mean as well organic dyes or pigments as mineral dyes or pigments or heavy metal salts forming with the amino compound colored complex salts.

What we claim is:—

1. A process of coloring higher fatty acids which comprises adding to the higher fatty acid in the liquid state a coloring matter and an amino compound.

2. A process of coloring higher fatty acids which comprises adding to the higher fatty acid in the liquid state a coloring matter, an amino compound and a heavy metal compound.

3. A process of coloring higher fatty acids which comprises adding to the higher fatty acid in the liquid state a coloring matter and a complex salt of an amino compound with a heavy metal salt.

4. A process of coloring higher fatty acids which comprises adding to the higher fatty acid in the liquid state a coloring matter, an amino compound and a complex salt of an amino compound with a heavy metal salt.

5. A process of coloring higher fatty acids which comprises adding to the higher fatty acid in the liquid state a coloring matter and an amino compound of the group consisting of alkyl amines, aryl amines, aralkyl amines, and hydroxyalkyl amines which per se are not dyes.

6. A process of coloring higher fatty acids which comprises adding to the higher fatty acid in the liquid state a coloring matter and an amino compound of the group consisting of alkyl amines, aryl amines, aralkyl amines, and hydroxyalkyl amines which per se are not dyes, and a heavy metal compound.

7. A process of coloring higher fatty acids which comprises adding to the higher fatty acid in the liquid state a coloring matter and beta-amino ethyl alcohol.

8. A process of coloring higher fatty acids which comprises adding to the higher fatty acid in the liquid state a coloring matter, beta-amino ethyl alcohol and a heavy metal compound.

9. A process of coloring higher fatty acids which comprises adding to the solution of a salt of a triaryl-methane dye in the higher fatty acid to be colored, beta-amino-ethyl alcohol and a copper salt.

10. The process which comprises dissolving the salt of a diphenyl naphthyl methane dye in a mixture of stearic acid and ceresin and adding beta-amino-ethyl alcohol and cupric chloride.

11. A higher fatty acid colored fastly to the action of light and containing besides the coloring agent an amino compound.

12. A higher fatty acid colored fastly to the action of light and containing besides the coloring agent an amino compound of the group consisting of alkyl amines, aryl amines, aralkyl amines and hydroxyalkyl amines which per se are not dyes.

13. A higher fatty acid colored fastly to the action of light and containing besides the coloring agent an aliphatic amino compound.

14. A higher fatty acid colored fastly to the action of light and containing besides the coloring agent beta-amino ethyl alcohol.

15. The process which comprises triturating alizarine blue B, (Schultz, Farbstofftabellen, 6th ed. No. 855) of the following formula:

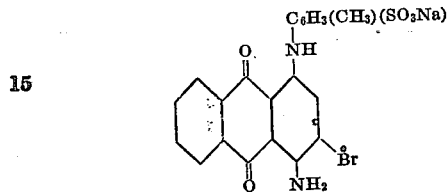

in the form of its free acid with butylamine and dissolving this dye preparation in a mixture of stearic acid and ceresin.

16. The process which comprises triturating a thioindigo with triethanol amine and dissolving this dye preparation in a mixture of stearic acid and ceresin.

17. A higher fatty acid colored fastly to the action of light and containing besides the coloring agent butylamine.

In testimony whereof, we affix our signatures.

HERMANN SCHLADEBACH.
HERBERT HÄHLE.